United States Patent
Kerpan

(10) Patent No.: US 10,662,985 B1
(45) Date of Patent: May 26, 2020

(54) RECAPTURE OF WASTED ENERGY IN SYSTEM

(71) Applicant: Daniel J. Kerpan, San Clemente, CA (US)

(72) Inventor: Daniel J. Kerpan, San Clemente, CA (US)

(*) Notice: Subject to any disclaimer, the term of this patent is extended or adjusted under 35 U.S.C. 154(b) by 0 days.

(21) Appl. No.: 16/224,551

(22) Filed: Dec. 18, 2018

(51) Int. Cl.
 *F15B 21/14* (2006.01)
 *B60S 3/06* (2006.01)

(52) U.S. Cl.
 CPC ............... *F15B 21/14* (2013.01); *B60S 3/06* (2013.01); *F15B 2211/205* (2013.01); *F15B 2211/7058* (2013.01); *F15B 2211/88* (2013.01)

(58) Field of Classification Search
 CPC .. B60S 3/06; B60S 3/063; B60S 3/066; F15B 21/14; F15B 2211/205; F15B 2211/7058; F15B 2211/88; E02F 9/2091; E02F 9/2217; Y10S 15/02
 See application file for complete search history.

(56) References Cited

U.S. PATENT DOCUMENTS

| 4,003,391 A * | 1/1977 | Smith | B60S 3/004 134/6 |
|---|---|---|---|
| 7,723,860 B2 | 5/2010 | Nagler | |
| 7,980,073 B2 * | 7/2011 | Jensen | B60W 20/19 60/414 |
| 8,344,531 B2 | 1/2013 | Chupa et al. | |
| 2004/0065349 A1 * | 4/2004 | Scheiter, Jr. | B60S 3/04 134/18 |
| 2010/0272916 A1 * | 10/2010 | Falbaum | B60S 3/04 427/427.2 |
| 2012/0023924 A1 * | 2/2012 | Clark | B60K 6/442 60/484 |
| 2013/0239992 A1 * | 9/2013 | Detrick | F15B 15/2876 134/18 |
| 2015/0001141 A1 | 1/2015 | Wieland | |
| 2016/0215481 A1 * | 7/2016 | Kawasaki | F15B 21/14 |
| 2019/0127955 A1 * | 5/2019 | Egawa | E02F 9/2091 |

FOREIGN PATENT DOCUMENTS

| WO | 2012105924 A1 | 8/2012 |
| WO | 2013088436 A1 | 6/2013 |
| WO | 2015022598 A1 | 2/2015 |

* cited by examiner

*Primary Examiner* — Michael Leslie
*Assistant Examiner* — Dustin T Nguyen
(74) *Attorney, Agent, or Firm* — Klein, O'Neill & Singh, LLP

(57) ABSTRACT

A car wash system including a hydraulic pump, the pump being overcapacity for the rotating cleaning elements to which it is connected. An output from the hydraulic pump is connected to a hydraulic motor, which is, in turn, connected to a generator. The generator is connected to a service panel. Thus, some of the spare capacity of the hydraulic pump may be used to generate electricity which may be returned to the grid, reducing operating costs of the automated car wash.

8 Claims, 6 Drawing Sheets

RECAPTURE OF WASTED ENERGY IN SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects described herein relate to a system for recapturing energy from an oversized hydraulic pump of a car wash system.

Car washes have a hydraulic pump at the core of their operation. The hydraulic pump operates several features of the car wash, including an arm which may be commonly mounted on a frame and moves in relation to the car during the car wash in order to clean the exterior of the car.

Also mounted on other apparatuses within the car wash may be various scrubbing elements. For example, there may be scrubbing elements specific to the wheels, scrubbing elements for each side of the car, or a single scrubbing element mounted such that it moves around the entire perimeter of the car. There may also be scrubbing elements which scrub the top of a car in the car wash. The scrubbing elements may be made of any number of materials. They may operate in a spinning or oscillating motion to clean the vehicle surface or apply the soap or other cleaning solution to the surface of the car. There are certain deficiencies in car wash systems.

Accordingly, there is a need in the art for an improved car wash system.

BRIEF SUMMARY

Hydraulic pumps used in car wash systems may provide power to operate rotating cleaning elements of the car wash system. By design, the hydraulic pump may have excess capacity when compared to the requirement to power all of the rotating cleaning elements attached to the hydraulic pump. The excess capacity of the pump may take the physical form of unused ports on the hydraulic pump. A hydraulic motor may be attached to the excess port. The hydraulic motor may run when hydraulic pump is running. An electric generator attached to the hydraulic motor may convert the kinetic energy of the motor to electrical energy. The electrical energy may be returned to a grid, or may be stored in a battery.

Additionally or alternatively, energy may be recaptured from rotating cleaning elements not being used by the car wash during a wash cycle. Rotating cleaning elements may be part of a selectively-on circuit. One selectively-on circuit may be dedicated to each rotating cleaning element in the car wash system. In addition to the rotating cleaning element, the selectively-on circuit may include a valve, a hydraulic motor, and an electrical generator connected to the hydraulic motor. The valve may selectively divert hydraulic fluid pumped from the hydraulic pump between the rotating cleaning element and the hydraulic motor. When the rotating cleaning element of the dedicated selectively-on circuit is not being used during a wash cycle, the valve may divert the hydraulic fluid to the hydraulic motor. The hydraulic motor may be powered by the diverted hydraulic fluid during the portion of wash cycle in which the rotating cleaning element is idle. The electric generator converts the kinetic energy of the hydraulic motor to electrical energy as long as the hydraulic motor is powered.

The car wash may be configured to perform a first car wash cycle, and a second car wash cycle. In the first car wash cycle, the car wash system may use some of the rotating cleaning elements of the car wash system. In the second car wash cycle, the car wash system may use the rotating cleaning elements used in the first wash cycle and additional rotating cleaning elements. In some car wash system configurations, the second car wash cycle may use all of the rotating cleaning elements in the car wash system. Additionally, two rotating cleaning elements may be used at any given point during the first or second car wash cycle. It is also possible that three rotating cleaning elements may be used during the wash cycle. Depending on the configuration of the car wash system, any number of the rotating cleaning elements may be used at any given point in the wash cycle. In both the first or second car wash cycle, some rotating cleaning elements may be idle for the entire wash cycle. A selectively-on circuit dedicated to any rotating cleaning element which is idle for the entire first or second wash cycle may run for the entire wash cycle. There may be fewer rotating cleaning elements which are idle in the second wash cycle.

In both the first and second wash cycles, each of the rotating cleaning elements may only be used during a portion of the wash cycle. When a rotating cleaning element is idle, a valve may divert the hydraulic fluid to the hydraulic motor in the selectively on circuit. The hydraulic fluid powers the hydraulic motor. Thus, even in a second wash cycle where all of the rotating cleaning elements are used at some point in the wash cycle, each selectively-on circuit in the car wash system may generate some electricity. Again, each rotating cleaning element may have a dedicated selectively-on circuit.

More particularly, disclosed is a car wash system, which may be configured to reclaim excess gallons per minute (GPM) capacity of a hydraulic pump of the car wash system. The car wash system may include one or more car wash rotating cleaning elements for washing an exterior surface of a car. The car wash may also be configured to perform a first car wash cycle, and a second car wash cycle. In the first car wash cycle, the car wash system may perform some of a plurality of cleaning applications. In the second car wash cycle, the car wash system may perform all of a plurality of cleaning applications. The car wash system may comprise a hydraulic pump, which may have a GPM capacity greater than a GPM requirement of the one or more car wash rotating cleaning elements, the difference may define an excess GPM capacity. The one or more car wash rotating cleaning elements may be connected to the hydraulic pump. A first hydraulic motor may be connected to the hydraulic pump, and the first hydraulic motor may be operated by the excess GPM capacity of the hydraulic pump. A first electrical generator may be connected to the first hydraulic motor and the generate electricity for transferring to an electric grid or a rechargeable battery.

The car wash system may further comprise a second hydraulic motor, which may be connected to the hydraulic pump and also may be connected to a corresponding one of the plurality of attached car wash rotating cleaning elements. The second hydraulic motor GPM requirement may be equal to or less than the one of the plurality of attached car wash rotating cleaning elements' GPM requirement. Further, a second electrical generator may be connected to the second hydraulic motor. Still further, at least one valve may selectively route hydraulic fluid from the hydraulic pump to the second hydraulic motor during the entire first car wash cycle because the corresponding one of the plurality of attached car wash rotating cleaning elements is not used during any of the some of a plurality of cleaning applications.

Also disclosed is a car wash system further comprising a second hydraulic motor which may be connected to the hydraulic pump and may be connected to a corresponding one of the plurality of attached car wash rotating cleaning elements. The second hydraulic motor GPM requirement may be equal to or less than the one of the plurality of car wash rotating cleaning elements' GPM requirement. A second electrical generator may be connected to the second hydraulic motor. Additionally, at least one valve may selectively route hydraulic fluid from the hydraulic pump to the second hydraulic motor when the corresponding one of the plurality of car wash rotating cleaning elements is not being used in the current one of the plurality of cleaning applications during the second car wash cycle.

Also disclosed is a car wash system configured to reclaim excess gallons per minute (GPM) capacity of a hydraulic pump of the car wash system. The car wash system may include one or more car wash rotating cleaning elements for washing an exterior surface of a car. The car wash may be configured to perform a first car wash cycle, and a second car wash cycle. In the first car wash cycle, the car wash system may perform some of a plurality of cleaning applications. In the second car wash cycle, the car wash system may perform all of a plurality of cleaning applications. The car wash system may comprise a hydraulic pump, which may be connected to the one or more car wash rotating cleaning elements. The hydraulic pump may have a hydraulic fluid GPM capacity greater than a GPM requirement of the one or more car wash rotating cleaning elements, the difference may define an excess GPM capacity. A first hydraulic motor may be connected to the hydraulic pump. The first hydraulic motor may be operated by the excess GPM capacity of the hydraulic pump. A first electrical generator may be connected to the first hydraulic motor. A second hydraulic motor may be connected to the hydraulic pump and may be connected to a corresponding one of the one or more car wash rotating cleaning elements. The second hydraulic motor GPM requirement may be equal to or less than the corresponding one of the one or more car wash rotating cleaning elements' GPM requirement. A second electrical generator may be connected to the second hydraulic motor. At least one valve may selectively route hydraulic fluid from the hydraulic pump to the second hydraulic motor during the first car wash cycle because the corresponding one of the one or more car wash rotating cleaning elements may not be used during any of the some of a plurality of cleaning applications. Wiring may connect the first electrical generator and second electrical generator to a service panel or a rechargeable battery.

Further disclosed is a car wash system further comprising a third hydraulic motor which may be connected to the hydraulic pump and may be connected to a third corresponding one of the one or more car wash rotating cleaning elements. The third hydraulic motor GPM requirement may be equal to or less than the GPM requirement of the third corresponding one of the plurality of car wash rotating cleaning elements. A third electrical generator may be connected to the third hydraulic motor. A third valve may selectively route, during the second wash cycle, hydraulic fluid from the hydraulic pump to the third hydraulic motor when the third corresponding one of the plurality of car wash rotating cleaning elements may not be being used during the concurrent one of the plurality of cleaning applications.

Further disclosed is car wash system, further comprising a plurality of hydraulic motors, each hydraulic motor may be connected to the hydraulic pump and may be connected to a corresponding one of the one or more car wash rotating cleaning elements. Each of the hydraulic motor GPM requirements may be equal to or less than the GPM requirement of the corresponding one of the plurality of car wash rotating cleaning elements. A corresponding electrical generator may be connected to each of the plurality of hydraulic motors. A corresponding valve which may selectively route, during the second wash cycle, hydraulic fluid from the hydraulic pump to the each hydraulic motor when the corresponding one of the plurality of car wash rotating cleaning elements may not be being used during the concurrent one of the plurality of cleaning applications.

Also disclosed is a car wash system configured to reclaim excess gallons per minute (GPM) capacity of a hydraulic pump of the car wash system. The car wash system may have one or more car wash rotating cleaning elements for washing an exterior surface of a car. The car wash may be configured to perform a first car wash cycle, and a second car wash cycle. In the first car wash cycle, the car wash system may perform some of a plurality of cleaning applications. In the second car wash cycle, the car wash system may perform all of a plurality of cleaning applications. The car wash system may comprise a hydraulic pump, which may be connected to the one or more car wash rotating cleaning elements. At least one hydraulic motor may be connected to the hydraulic pump and may be connected to a first corresponding one of the one or more car wash rotating cleaning elements. The at least one hydraulic motor GPM requirement may be equal to or less than the GPM requirement of the first corresponding one of the plurality of car wash rotating cleaning elements. An electrical generator may be connected to the at least one hydraulic motor. At least one valve may selectively route, during the second wash cycle, hydraulic fluid from the hydraulic pump to the at least one hydraulic motor when the first corresponding one of the plurality of car wash rotating cleaning elements may not be being used during the concurrent one of the plurality of cleaning applications. Wiring may connect the electrical generator to a service panel or a rechargeable battery.

Further disclosed is a car wash system further comprising a second hydraulic motor which may be connected to the hydraulic pump and may be connected to a second corresponding one of the one or more car wash rotating cleaning elements. The second hydraulic motor GPM requirement may be equal to or less than the GPM requirement of the second corresponding one of the plurality of car wash rotating cleaning elements. A second electrical generator may be connected to the second hydraulic motor. A second valve may selectively route, during the second wash cycle, hydraulic fluid from the hydraulic pump to the second hydraulic motor when the second corresponding one of the plurality of car wash rotating cleaning elements may not be being used during the concurrent one of the plurality of cleaning applications.

Further disclosed is a car wash system, further comprising a plurality of hydraulic motors, each hydraulic motor may be connected to the hydraulic pump and may be connected to a corresponding one of the one or more car wash rotating cleaning elements. Each of the hydraulic motor GPM requirements may be equal to or less than the GPM requirement of the corresponding one of the plurality of car wash rotating cleaning elements. A corresponding electrical generator may be connected to each of the plurality of hydraulic motors. a corresponding valve may selectively route, during the second wash cycle, hydraulic fluid from the hydraulic pump to the each hydraulic motor when the corresponding one of the plurality of car wash rotating cleaning elements may not be being used during the concurrent one of the plurality of cleaning applications.

Also disclosed is a method of recapturing energy from a car wash system. The car wash system may be configured to reclaim excess gallons per minute (GPM) capacity of a hydraulic pump of the car wash system. The car wash system may have one or more car wash rotating cleaning elements for washing an exterior surface of a car. The car wash may be configured to perform a first car wash cycle, and a second car wash cycle. In the first car wash cycle, the car wash system may perform some of a plurality of cleaning applications. In the second car wash cycle, the car wash system may perform all of a plurality of cleaning applications. The method may comprise providing a hydraulic pump having a GPM capacity greater than a GPM requirement of the one or more car wash rotating cleaning elements, the difference may define an excess GPM capacity. The one or more car wash rotating cleaning elements may be connected to the hydraulic pump. A first hydraulic motor may be connected to the hydraulic pump. The first hydraulic motor may be operated by the excess GPM capacity of the hydraulic pump.

A first electrical generator may be connected to the first hydraulic motor in order to generate electricity for transferring to an electric grid or a rechargeable battery. A first car wash cycle may be initiated. The electricity generated may be passed to an electric grid or to a rechargeable battery.

Further disclosed is a method further comprising, before the step of initiating a car wash, thereby operating the hydraulic pump and the a hydraulic motor and connected generator to generate electricity, a step where a second hydraulic motor may be connected to the hydraulic pump and may be connected to a corresponding one of the plurality of attached car wash rotating cleaning elements. The second hydraulic motor GPM requirement may be equal to or less than the corresponding one of the plurality of car wash rotating cleaning elements' GPM requirement. A second electrical generator may be connected to the second hydraulic motor. At least one valve may be connected to the hydraulic pump, may be connected to the second hydraulic motor and may be connected to the corresponding one of the plurality of car wash cleaning elements. At least one valve may selectively route hydraulic fluid from the hydraulic pump to either the second hydraulic motor or the corresponding one of the plurality of car wash rotating cleaning elements. The at least one valve may selectively route hydraulic fluid from the hydraulic pump to the second hydraulic motor during the first car wash cycle because the corresponding one of the one or more car wash rotating cleaning elements may not be used during any of the some of a plurality of cleaning applications.

Further disclosed is a method for recapturing energy from a car wash system, further comprising, before the step of initiating a car wash, thereby operating the hydraulic pump and the a hydraulic motor and connected generator to generate electricity, a step where a second hydraulic motor may be connected to the hydraulic pump and may be connected to one of the plurality of attached car wash rotating cleaning elements. The second hydraulic motor GPM requirement may be equal to or less than the one of the plurality of attached car wash rotating cleaning elements GPM requirement. A second electrical generator may be connected to the second hydraulic motor. The hydraulic pump may be connected to the second hydraulic motor and may be connected to the one of the plurality of car wash cleaning elements. At least one valve may selectively route hydraulic fluid from the hydraulic pump to either the second hydraulic motor or the one of the plurality of car wash rotating cleaning elements. The first car wash cycle may include at least one cleaning application using the one of the plurality of car wash rotating cleaning elements. The valve may be set so that the valve may route the hydraulic fluid to the second hydraulic motor during at least one of the plurality of cleaning applications, because the one of the plurality of car wash rotating cleaning elements may not be in operation during the at least one of the plurality of cleaning applications.

Further disclosed is a method of assembling a car wash system configured to reclaim excess gallons per minute (GPM) capacity of a hydraulic pump of the car wash system. The car wash system may have one or more car wash rotating cleaning elements for washing an exterior surface of a car. The method may comprise the steps of providing a hydraulic pump having a GPM capacity greater than a GPM requirement of the one or more car wash rotating cleaning elements, defining an excess GPM capacity; connecting the one or more car wash rotating cleaning elements to the hydraulic pump; connecting a first hydraulic motor to the hydraulic pump, the first hydraulic motor operated by the excess GPM capacity of the hydraulic pump; connecting a first electrical generator to the first hydraulic motor in order to generate electricity for transferring to an electric grid or a rechargeable battery; and connecting the generator to an electric grid or to a rechargeable battery.

In the method, the car wash may be configured to perform a first car wash cycle, a second car wash cycle and one or more additional cleaning applications of the plurality of cleaning applications. In the first car wash cycle, the car wash system may perform some of a plurality of cleaning applications. In the second car wash cycle, the car wash system may perform the cleaning applications of the first car wash cycle. The one or more car wash rotating cleaning elements for washing an exterior surface of a car may include a first rotating cleaning element.

The method may further comprise the steps of connecting a second hydraulic motor to the hydraulic pump and to the first rotating cleaning element, the second hydraulic motor GPM requirement equal to or less than the first rotating cleaning elements' GPM requirement; connecting a second electrical generator to the second hydraulic motor; connecting at least one valve to the hydraulic pump, the second hydraulic motor and the first rotating cleaning element, the at least one valve configured to selectively route hydraulic fluid from the hydraulic pump to either the second hydraulic motor or the first rotating cleaning element; selectively routing, via the at least one valve, hydraulic fluid from the hydraulic pump to the second hydraulic motor during the first car wash cycle, and selectively routing, via the at least one valve, hydraulic fluid from the hydraulic pump to the second hydraulic motor during some of the cleaning applications of the second car wash cycle.

The method may further comprise the steps of connecting a second hydraulic motor to the hydraulic pump and to the first rotating cleaning element, the second hydraulic motor GPM requirement equal to or less than the one of the plurality of attached car wash rotating cleaning elements GPM requirement; connecting a second electrical generator to the second hydraulic motor; connecting at least one valve to the hydraulic pump and the second hydraulic motor and the first rotating cleaning element, at least one valve selectively routing hydraulic fluid from the hydraulic pump to either the second hydraulic motor or the first rotating cleaning element; wherein the first car wash cycle includes at least one cleaning application using the first rotating cleaning element, and the second car wash cycle includes at least one cleaning application using the first rotating cleaning element.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
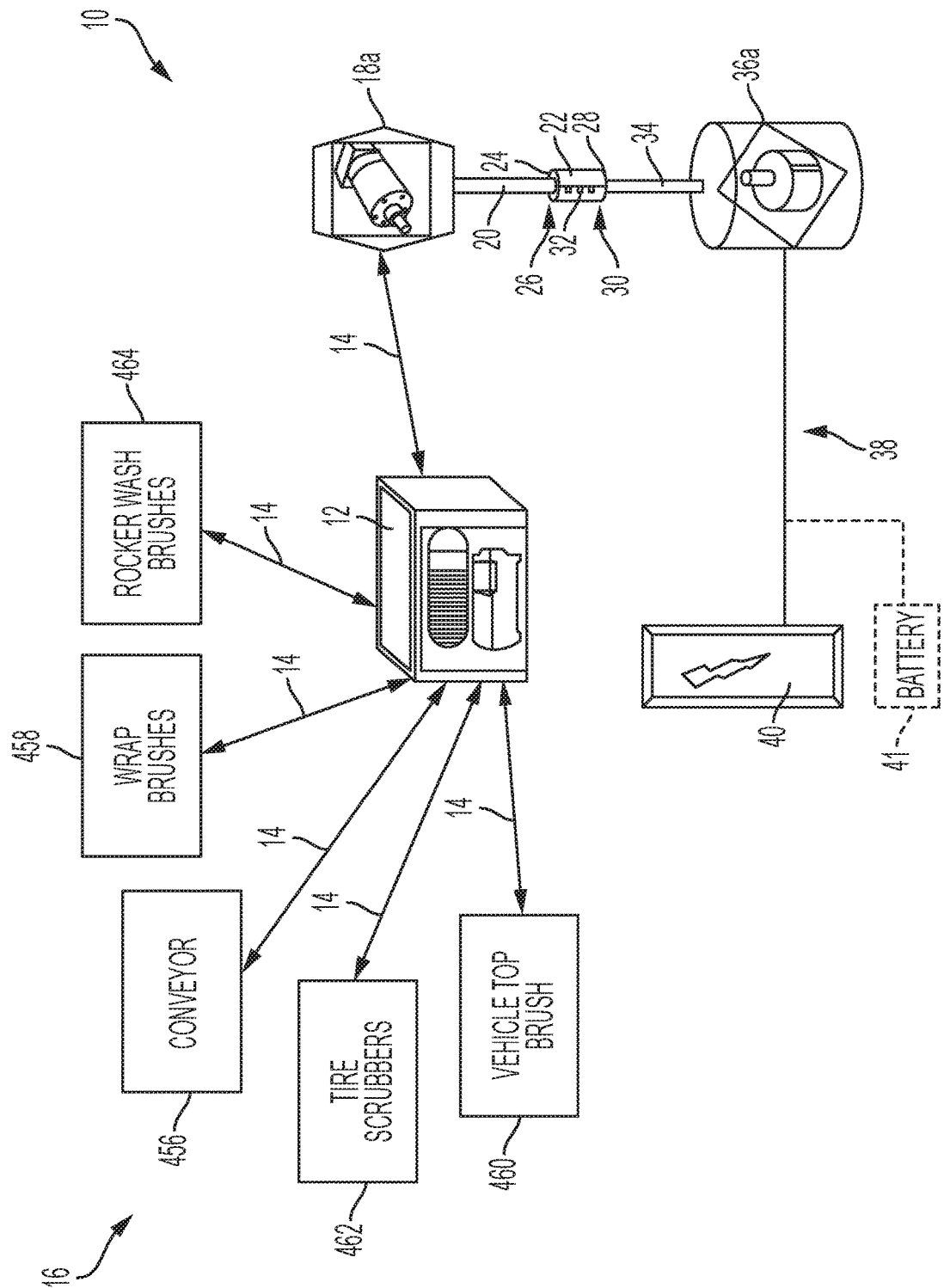
FIG. 1 shows a cartoon view of a car wash system.

Hydraulic pumps 12 may be used to power car wash systems 10. Specifically, the hydraulic pump 12 may power one or more rotating cleaning elements 456, 458, 460, 462, 464 of the car wash system 10. Different car wash system configurations may include a different number of rotating car wash cleaning elements. By way of example and not limitation, rotating cleaning elements may include vehicle top brushes 460, conveyors 466, side scrubbers (not shown), top scrubbers (not shown), tire scrubbers 462, rocker wash brushes 464 and wrap brushes 458. Car wash systems with more car wash rotating cleaning elements 456, 458, 460, 462, 464 may require a hydraulic pump 12 with more capacity. In addition to the capacity required by the aggregate of the rotating cleaning elements 456, 458, 460, 462, 464, the hydraulic pump 12 may have excess capacity. The excess capacity may be access by unused ports 50 on the hydraulic pump 12. To recapture some energy of the car wash system 10, a hydraulic motor 18a may be connected to an unused port 50 on a hydraulic pump 12. The hydraulic motor 18a may run when hydraulic pump 12 is running. An electric generator 36a attached to the hydraulic motor 18a may convert the kinetic energy of the hydraulic motor 18a to electrical energy. The electrical energy may be returned to a grid via a service panel 40, or may be stored in a battery.

Additionally or alternatively, energy may be recaptured from rotating cleaning elements 456, 458, 460, 462, 464 not being used by the car wash system 10 for periods of wash cycles. Rotating cleaning elements 456, 458, 460, 462, 464 may be part of a selectively-on circuit 200. One selectively-on circuit 200 may be dedicated to each rotating cleaning element 456, 458, 460, 462, 464 in the car wash system. Alternatively, only some of the rotating cleaning elements 456, 458, 460, 462, 464 may have a dedicated selectively-on circuit 200. In addition to the rotating cleaning element 456, 458, 460, 462, 464 the selectively-on circuit 200 may include one or more valves 54, 56, a hydraulic motor 18b, and an electrical generator 36b connected to the hydraulic motor 18b. The one or more valves 54, 56 may selectively divert hydraulic fluid pumped from the hydraulic pump 12 to either the rotating cleaning element 456, 458, 460, 462, 464, or the hydraulic motor 18b of the selectively on circuit 200. When the rotating cleaning element 456, 458, 460, 462, 464, of the dedicated selectively-on circuit 200 is not being used during a wash cycle, one or more valves 54, 56 may divert the hydraulic fluid to the hydraulic motor 18b. The hydraulic motor 18b may be powered by the diverted hydraulic fluid during the portion of wash cycle in which the rotating cleaning element 456, 458, 460, 462, 464 is idle. The electric generator 36b converts the kinetic energy of the hydraulic motor 18b to electrical energy as long as the hydraulic motor 18b is powered. The always-on 100 and selectively-on 200 circuits and their operation are described in more detail below.

The required capacity for the hydraulic pump 12 may be determined by the flow in gallons per minute (GPM) required to operate the rotating cleaning elements 456, 458, 460, 462, 464 in use during the cleaning application with the greatest load. A cleaning application may be defined as the use of one or more rotating cleaning elements 456, 458, 460, 462, 464 to perform a particular cleaning task during a portion of the car wash cycle.

FIG. 1 shows a generalized diagram view of a car wash system 10. By way of example and not limitation, the car wash system 10 may be an exterior rollover car wash system, or a conveyor system, or a drive through car wash system. The car wash system 10 may be fully or partially automated. A conveyor system will be used as an exemplary car wash system 10, but it is understood that the disclosure may apply to any of the above car wash systems 10. A car (not shown) drives in to the car wash system 10, and the car may be conveyed through a number of different stages. Each stage may perform a different cleaning task. By way of example and not limitation, cleaning tasks may include applying soap, scrubbing, rinsing, etc. Each car wash system may have certain components driven by a hydraulic pump 12. Output lines 14 may connect to a plurality of output ports on the hydraulic pump 12. On an opposite end, each of the plurality of output lines 14 may connect to one of a plurality of car wash rotating cleaning elements 16. The one of a plurality of car wash rotating cleaning elements 16 may also connect to a return line 15. On an opposite end, the return line 15 may connect to the hydraulic pump 12. The rotating cleaning elements 456, 458, 460, 462, 464 may turn on and off depending on a selected car wash cycle and the cleaning application being performed at any given point during the car wash cycle. Collectively, the car wash rotating cleaning elements 16 create a load on the hydraulic pump 12.

FIG. 1 further shows a recapture system. The output capacity of the hydraulic pump may be measured in gallons per minute (GPM). The car wash rotating cleaning elements 16 attached to the hydraulic pump 12 create a GPM requirement. The difference between the GPM capacity of the hydraulic pump 12, and the GPM requirement of the car wash rotating cleaning elements 16 defines an excess GPM capacity. The recapture circuit may be used to capture the excess GPM capacity of the hydraulic pump. The recapture system will be discussed in more detail below.

Figure 2:
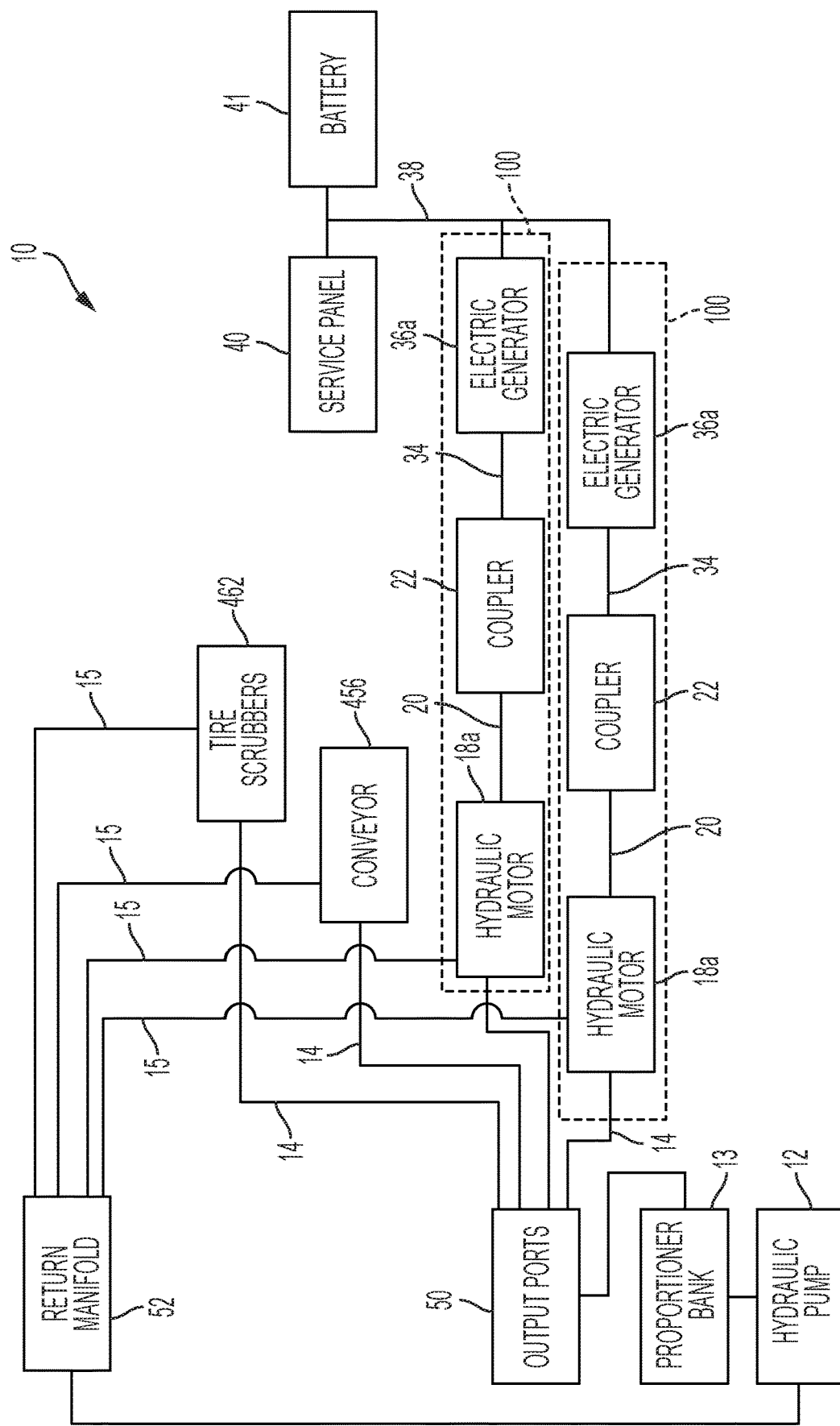
FIG. 2 shows a schematic view of a car wash system with a plurality of recapture systems.

As is shown in FIG. 2, the hydraulic pump 12 further may further include a proportioner bank 13. The proportioner bank 13 may include a plurality of output ports 50. Each of the output ports 50 may include a speed adjustment which can control the revolutions per minute (rpm) of the connected rotating cleaning element. The aggregate of the speed settings may affect the excess capacity of the hydraulic pump 12. By way of example and not limitation, if each of the output ports 50 is not run at full capacity, the hydraulic pump may have more excess capacity. The hydraulic pump may also include a return manifold 52. The return manifold may aggregate the return lines 15 to a single line or pipe. The output lines 14 may correspond to outlet ports 50 on the proportioner bank 13, and the return lines 15 may correspond to the return connections on the return manifold 52.

With reference to both FIGS. 1 and 2, another high pressure hydraulic output line 14 may be connected to an open output port 50 on the proportioner bank 13. This output line 14 may be connected on an opposite end to the hydraulic motor 18a. As hydraulic fluid enters the hydraulic motor 18a, the hydraulic fluid turns the hydraulic motor 18a. The hydraulic fluid may exit the hydraulic motor 18a and enter a return line 15. The return line 15 may connect to the return manifold 52.

The output shaft 20 of the hydraulic motor 18a may be connected to a mechanical connector 22. By way of example and not limitation, the mechanical connector 22 might be a coupler. The mechanical connector 22 may be a hollow cylindrical member which has a first interior 24 defining a first interior diameter to accept an output shaft 20 with a corresponding diameter on one end 26. The mechanical connector 22 may also include a second interior 28 defining a second interior diameter to accept a transfer shaft with a corresponding diameter on the opposite end 30. The shafts may be held in place, by at least one set screw 32 or other mechanical connector. The hydraulic motor output shaft 20 may be connected to one end of the coupler 22. The opposite end 30 of the coupler 22 may be connected to a generator shaft 34.

The generator 36a, 36b may be similar in design to those used in wind turbines. Wind turbine generators may be configured to produce three phase alternating current electricity when the generator shaft is turned by a wind-driven propeller. Wind turbine generators may be connected to the electrical grid to provide power to consumers. Similarly, here the generator 36a, 36b may be connected to a service panel 40 by three phase electrical wiring 38. Alternatively, the generator 36a, 36b may be connected to an inverter then the service panel 40 by single phase wiring, 120V or 3 phase, 208V, 277V, 460V, 480V. Alternatively, the electrical output may be sent to a rechargeable battery or bank of batteries 41.

The service panel 40 may be equipped to allow power to flow back out through the service panel 40 to the grid (not shown). The owner or operator of the automated car wash system 10 may be credited for the amount of electricity passed to the grid through the service panel 40. The generated electricity represents recapture of some of the energy of the car wash system 10. Recapture of the over capacity of the hydraulic pump 12 prevents needless waste of the energy of the system.

With further reference to FIG. 2, an always-on circuit 100 for recapturing energy is shown outlined by the dotted line. As long as the hydraulic pump 12 is operating, hydraulic fluid may be pumped out of the output port 50 and through the output line 14 to drive the hydraulic motor 18a. The hydraulic fluid may be returned via a return line 15 to the return manifold 52. There may be as many always-on circuits 100 as there are excess output ports 50 on the hydraulic pump 12.

Figure 3:
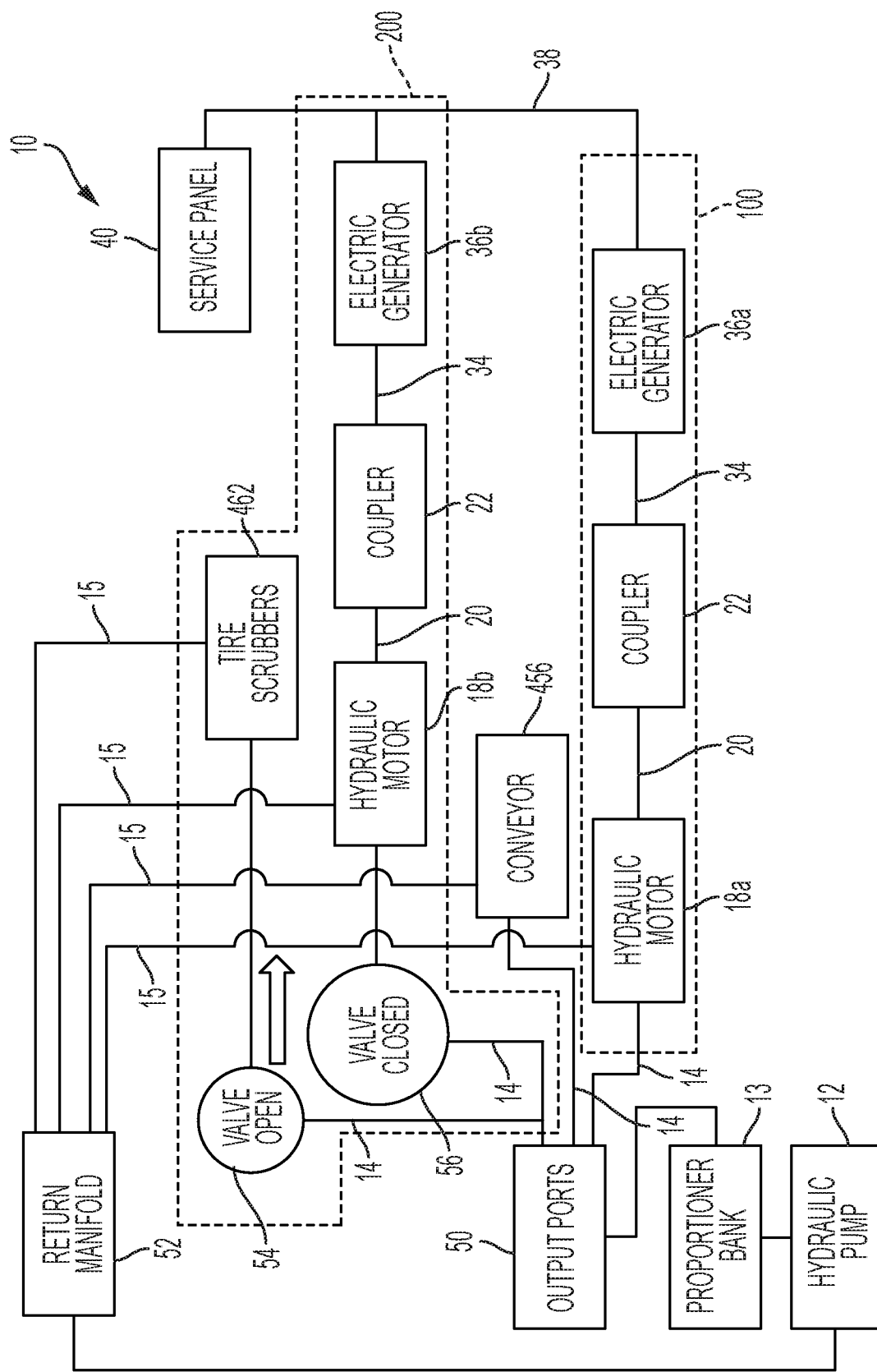
FIG. 3 shows a schematic view of a car wash system with a selectively on system in a first state.
Figure 4:
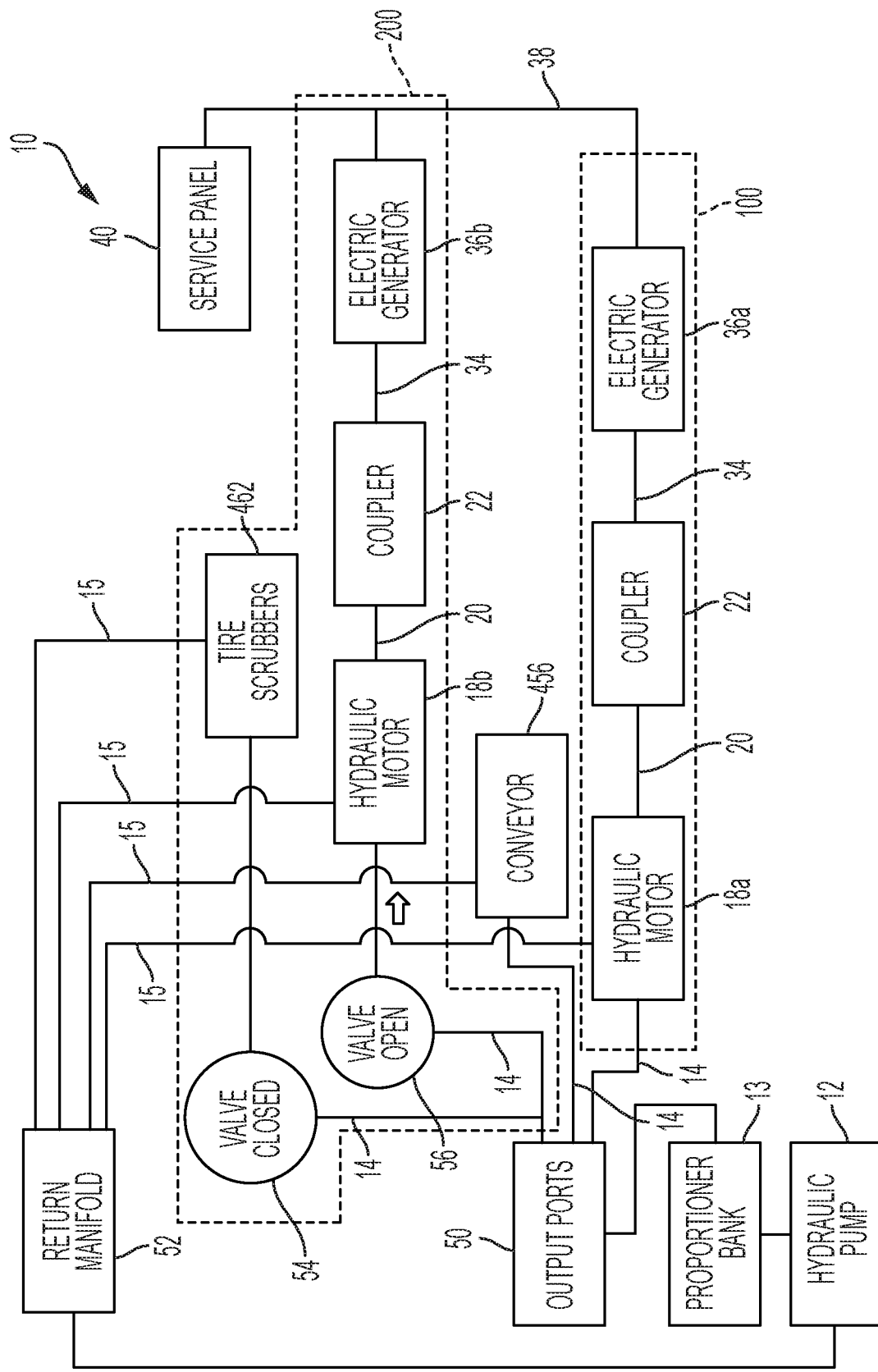
FIG. 4 shows a schematic view of a car wash system with a selectively on system in a second state.
Figure 5:
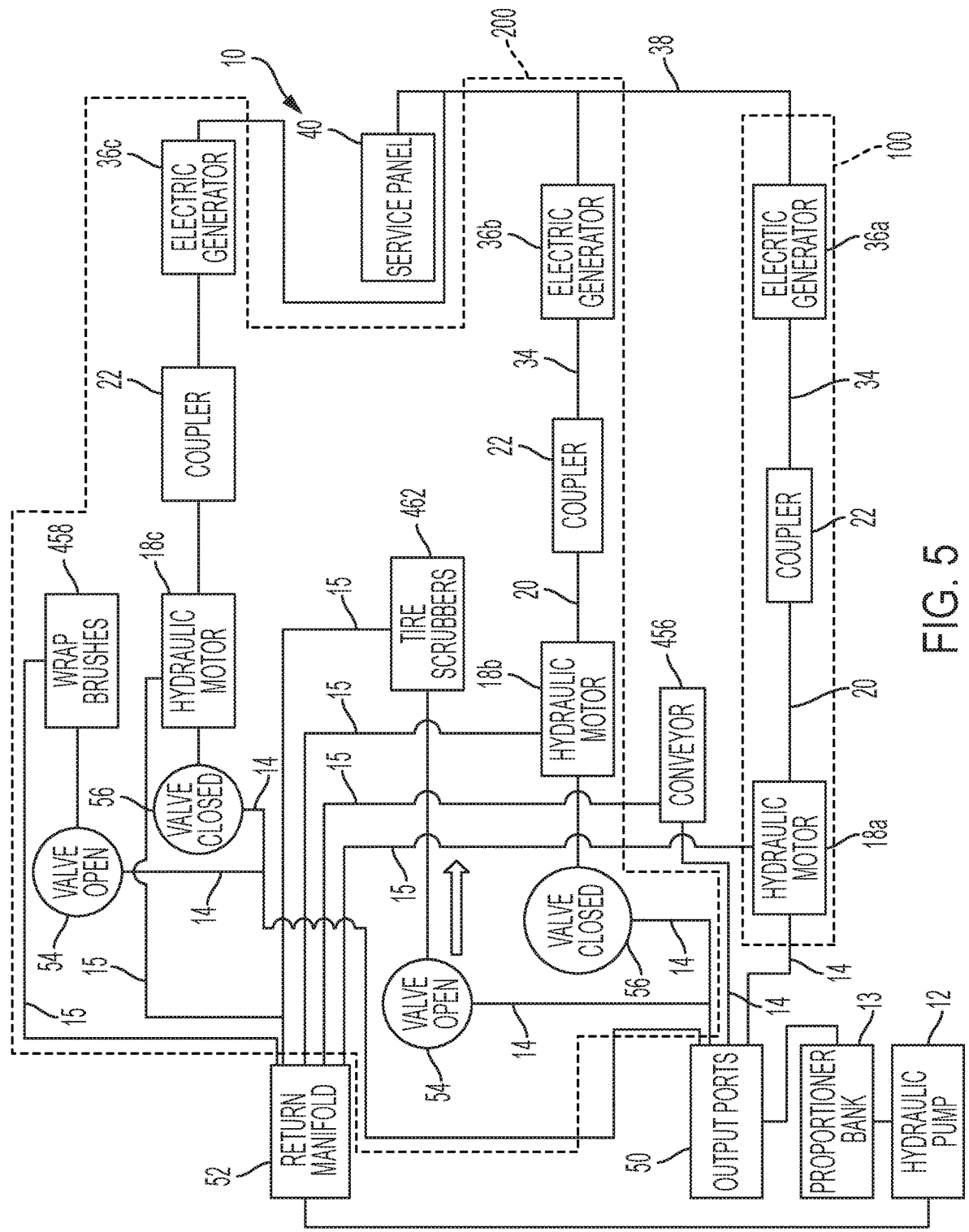
FIG. 5 shows a schematic view of the car wash system in the first state of FIG. 3 with two selectively on systems.
Figure 6:
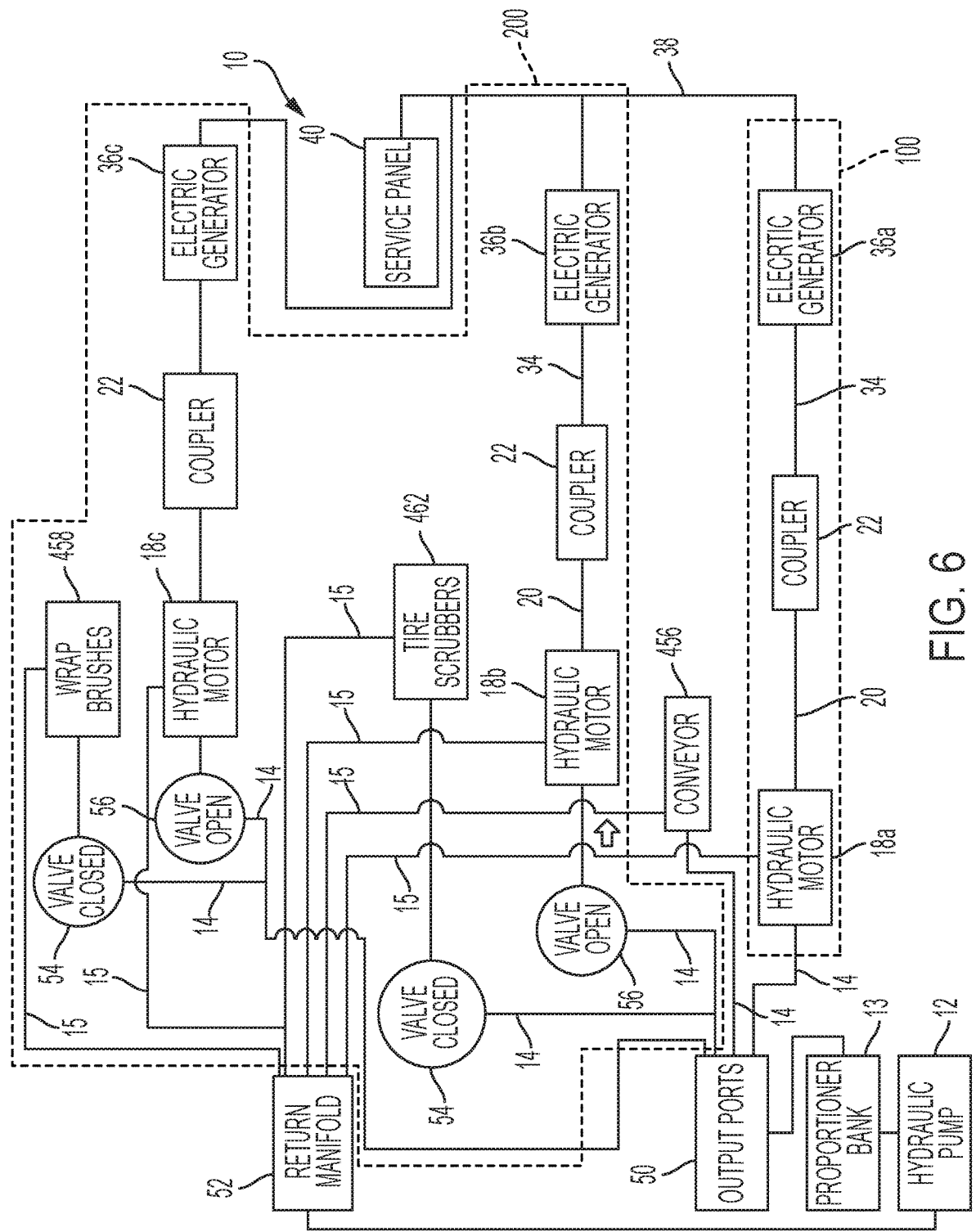
FIG. 6 shows a schematic view of the car wash system in the second state of FIG. 4 with two selectively on systems.

Alternatively or additionally, the car wash system 10 may include a selectively-on circuit 200. FIGS. 3 and 4 show a configuration with both an always-on circuit 100, and a selectively-on circuit 200. The always-on circuit 100 was discussed above in relation to components of the car wash system 10 shown in FIG. 2. The always-on circuit 100 in the configuration of FIGS. 3 and 4 operates in the same manner as the always-on circuit 100 in the configuration of FIG. 2.

Car wash systems 10 may include the option for a user to select two or more types of wash. The types of wash may also be called wash cycles. By way of example and not limitation, an exemplary car wash system 10 may offer a first car wash cycle, during which the car wash system uses a first set of rotating cleaning elements 456. The same exemplary car wash system 10 may also offer a second car wash cycle. The second car wash cycle may use all of the first set of rotating cleaning elements 456 of the first car wash cycle, and may further use additional rotating cleaning elements. It may further be possible that the second type of wash uses every rotating cleaning element in the car wash system 10. In the first car wash cycle, certain rotating cleaning elements may be idle for part of the wash cycle, and other rotating cleaning elements may be idle for the entire wash cycle. In the second car wash cycle, just, as with the first car wash cycle, certain rotating cleaning elements may be idle for part of the wash cycle, and other rotating cleaning elements may be idle for the entire wash cycle. However, the number of rotating cleaning elements idle for the entire wash cycle may be fewer than for the first wash cycle. Alternatively, all of the rotating cleaning elements may be used at some point in the wash cycle. In this case, there would be no rotating cleaning elements idle for the entire wash cycle.

FIGS. 3 and 4 each show a plurality of rotating cleaning elements, including a conveyor 456 and tire scrubbers 462. Depending on the car wash cycle selected, some of the rotating cleaning elements may only function during the second car wash cycle. Because all rotating cleaning elements are connected to the hydraulic pump 12, the rotating cleaning elements receive hydraulic fluid from the hydraulic pump 12 even when the specific rotating cleaning element may be idle during a specific car wash cycle. To take advantage of the energy being sent to idle rotating cleaning elements, each of these rotating cleaning elements may further be connected to a selectively-on circuits 200.

A selectively-on circuit 200 is surrounded by the dotted line in FIG. 3. A single hydraulic line 14 connected to an output port 50 may be split in a "Y" configuration. Each side of the "Y" may include an in line valve 54, 56. The in line valves 54, 56 may be controlled by a controller (not shown). Alternatively, a diverter valve (not shown) may be placed at the "Y." FIG. 3 shows the in line valve 54 on the line to the tire scrubbers 462 in an open position. Because the valve 54 is in the open position, hydraulic fluid is flowing to the tire scrubber 462 rotating cleaning element, operating the tire scrubbers 462. The direction of flow of the hydraulic fluid is indicated by the arrow in FIG. 3. On the other side of the "Y," the in line valve 56 in line with the hydraulic motor 18b is in a closed position. Because the valve 56 is in a closed position, the hydraulic motor 18b of the selectively-on circuit 200 is not functioning. Thus, the selectively-on circuit 200 is not generating any electricity.

FIG. 4 shows the in line valves 54, 56 in the opposite configuration. In FIG. 4, the in line valve 54 is closed, and the tire scrubbers 462 are not receiving flow of hydraulic fluid. The tire scrubbers 462 are idle when not receiving a flow of hydraulic fluid. As discussed above, the rotating cleaning element may be idle either because the rotating cleaning element is not required during that portion of the wash cycle, or a wash cycle has been selected which does not include the use of that rotating cleaning element. The in line valve 56 of the hydraulic motor 18a is in an open position. The direction of flow is indicated by the arrow in FIG. 4. The hydraulic motor 18b is turning. The electric generator 36b connected to the hydraulic motor 18b is generating electricity. The electricity passes to the service panel 40. The hydraulic fluid from either the tire scrubber 462 or the hydraulic motor 18b pass through a "Y" configuration hydraulic line back to a return manifold 52. The two branches of the "Y" configuration hydraulic line 14 may include some form of backflow prevention (not shown) to ensure that the hydraulic fluid both maintains pressure and is routed properly. It is understood that every car wash rotating cleaning element may be part of a selectively-on circuit.

By way of example and not limitation, in operation, a user may select a type of wash from a menu of wash cycles. This typically may be done at a kiosk outside of the car wash interior. There may be two or more wash cycles from which a user may choose. For example, one wash cycle may be a basic wash cycle, and the other may be an advanced wash cycle. After making a selection, the user may move a car in to the interior of the car wash.

If the user chose the first wash cycle, the user may move the car in to the car wash. The car may engage a conveyor 456. The conveyor 456 may be one of the car wash rotating cleaning elements 456, 462 powered by the hydraulic pump 12. The hydraulic pump 12 starts and initiates the wash cycle. The rotating cleaning elements 456 associated with the first wash cycle operate according to wash cycle programming.

Each car wash rotating cleaning element 456, 462 may further include a bypass (not shown). The bypass may be controlled by a controller (not shown). The controller may control the bypass so that the car wash rotating cleaning element 456, 462 is only engaged when the corresponding portion of the wash cycle is occurring.

In addition, some components connected to the hydraulic pump 18a may run continuously. By way of example and not limitation, the conveyor and any hydraulic motor 18a directly connected to the hydraulic pump 12 may run continuously. Because any hydraulic motor 18a which may be directly connected to the hydraulic pump 12 may be operating continuously, the electric generator 36a connected the hydraulic motor 18a may be continuously generating electricity. The hydraulic motor 18a circuit which may be connected directly to the hydraulic pump 12 is a part of the always-on circuit 100 described above.

However, some car wash rotating elements may not be used in the first wash cycle at all. For example, the car wash may be equipped with tire scrubbers 462. Tire scrubbing may not be used in the first wash cycle. Therefore, the tire scrubbers 462 may be idle during the first wash cycle. The tire scrubbers 462 may be connected to a selectively-on circuit 200. Because the tire scrubbers 462 may not be included in the first wash cycle, the tire scrubbers 462 may be idle for the entire first wash cycle. Because the tire scrubbers 462 are connected to a selectively-on circuit 200, rather than the hydraulic pump 12 simply pumping hydraulic fluid through a bypass of the tire scrubbers 462, the hydraulic fluid may be diverted to the selectively-on circuit 200. The selectively-on circuit 200 may receive hydraulic fluid from the hydraulic pump 12 through the entire first wash cycle. The selectively-on circuit 200 may run the entire basic wash cycle, generating electricity which may be returned to an electrical grid, or may be sent to a rechargeable battery or bank of batteries. Any rotating cleaning elements 456, 462 used during the basic wash cycle may also be part of a selectively-on circuit 200, which may run for a portion of the first wash cycle. When the wash cycle is complete, the car may exit the car wash.

Alternatively, the user may select the second or advanced wash cycle at the kiosk, and enter the car wash, as described above. During the advanced wash cycle, all of the car wash rotating cleaning elements used in the first wash cycle may be used during advanced wash cycle as well as additional rotating cleaning elements. For example, both the conveyor 456 and the tire scrubbers 462 may be used during some portion of the second wash cycle. The conveyor 456 may run during the entirety of the wash cycle. The tire scrubbers 462 may operate during a portion of the wash cycle. During the remainder of advanced wash cycle, the tire scrubbers 462 may be idle. While the tire scrubbers 462 are idle, the at least one valve 54, 56 may route hydraulic fluid to the selectively-on circuit 200. Specifically, hydraulic fluid may be routed to the hydraulic motor 18b side of the selectively-on circuit 200 during the portion of the car wash cycle that the tire scrubbers 462 are idle. Every other car wash rotating cleaning element in the car wash system 10 may also be part of a dedicated selectively-on circuit 200. All but one rotating cleaning element 456, 462 may be idle during at least one portion of the second wash cycle. Thus, every car wash rotating cleaning element may be part of a selectively-on circuit 200, and the hydraulic motor 18b corresponding to each of the selectively-on circuits 200 may be generating electricity when the car wash rotating cleaning element is not being used. In addition, any always-on circuit 100 which may be connected to the hydraulic pump 12 may continue to function throughout the advanced car wash cycle. When the advanced wash is complete, the car exits the car wash.

Depending on the configuration of the car wash, the conveyor may take the car from stage to stage in the car wash, and in each stage, a different cleaning application may be performed. Alternatively, the car wash equipment may move around the car once a car may move on to a pressure plate, which may activate a switch, starting the car wash. The cleaning application which may correspond to the selected wash cycle may be performed serially. Any cleaning applications not corresponding to the selected wash cycle may be skipped. Where cleaning applications corresponding to car wash rotating cleaning elements may be skipped, or just may not currently be performed, selectively-on circuits may route hydraulic fluid to hydraulic motors which may be connected to electric generators, to generate electricity. Similar to the basic wash cycle, once all of the cleaning applications for the selected car wash cycle are compete, the user may exit the wash, and the system starts the next selected wash, or sits idle until a new user selects a wash.

The above description is given by way of example, and not limitation. Given the above disclosure, one skilled in the art could devise variations that are within the scope and spirit of the invention disclosed herein, including various ways of configuring the automated car wash system. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A car wash system configured to reclaim excess gallons per minute (GPM) capacity of a hydraulic pump of the car wash system, the car wash system including one or more car wash rotating cleaning elements for washing an exterior surface of a car, the car wash system comprising:

the hydraulic pump having a GPM capacity greater than a GPM requirement of the one or more car wash rotating cleaning elements at maximum load, wherein the GPM requirement is defined as flow in gallons per minute required to operate the one or more car wash rotating cleaning elements at maximum load, the difference between the GPM capacity and the GPM requirement defining the excess GPM capacity;

the one or more car wash rotating cleaning elements wherein the hydraulic pump is fluidly connected to the one or more car wash rotating cleaning elements;

a first hydraulic motor wherein the hydraulic pump is fluidly connected to the first hydraulic motor, the first hydraulic motor operated by the excess GPM capacity of the hydraulic pump;

a first electrical generator wherein the first hydraulic motor is drivingly connected to the first electrical generator and the first electrical generator is operative to generate electricity for transferring to an electric grid or a rechargeable battery;

a second hydraulic motor wherein the hydraulic pump is fluidly connected to the second hydraulic motor and the second hydraulic motor is systemically connected to a first car wash rotating cleaning element;

a second electrical generator wherein the second hydraulic motor is drivingly connected to the second electrical generator;

at least one valve which selectively routes hydraulic fluid from the hydraulic pump to the second hydraulic motor during an entire first car wash cycle;

wherein the car wash system is configured to perform the first car wash cycle, and a second car wash cycle, in the first car wash cycle, the car wash system performs some of a plurality of cleaning applications, and in the second car wash cycle, the car wash system performs the cleaning applications of the first car wash cycle, and one or more additional cleaning applications of the plurality of cleaning applications; and wherein the one or more car wash rotating cleaning elements for washing the exterior surface of the car includes the first car wash rotating cleaning element, and a second car wash rotating cleaning element.

2. A car wash system configured to reclaim excess gallons per minute (GPM) capacity of a hydraulic pump of the car wash system, the car wash system including one or more car wash rotating cleaning elements for washing an exterior surface of a car, the car wash system comprising:

the hydraulic pump having a GPM capacity greater than a GPM requirement of the one or more car wash rotating cleaning elements at maximum load, wherein the GPM requirement is defined as flow in gallons per minute required to operate the one or more car wash rotating cleaning elements at maximum load, the difference between the GPM capacity and the GPM requirement defining the excess GPM capacity;

the one or more car wash rotating cleaning elements wherein the hydraulic pump is fluidly connected to the one or more car wash rotating cleaning elements;

a first hydraulic motor wherein the hydraulic pump is fluidly connected to the first hydraulic motor, the first hydraulic motor operated by the excess GPM capacity of the hydraulic pump;

a first electrical generator wherein the first hydraulic motor is drivingly connected to the first electrical generator and the first electrical generator is operative to generate electricity for transferring to an electric grid or a rechargeable battery;

a second hydraulic motor wherein the hydraulic pump is fluidly connected to the second hydraulic motor and the second hydraulic motor is systemically connected to a first car wash rotating cleaning element;

a second electrical generator wherein the second hydraulic motor is drivingly connected to the second electrical generator;

at least one valve which selectively routes hydraulic fluid from the hydraulic pump to the second hydraulic motor when the first car wash rotating cleaning element is not being used during operation of the car wash system;

wherein the car wash system is configured to perform a first car wash cycle, and a second car wash cycle, in the first car wash cycle, the car wash system performs some of a plurality of cleaning applications, and in the second car wash cycle, the car wash system performs the cleaning applications of the first car wash cycle, and one or more additional cleaning applications of the plurality of cleaning applications; and wherein the one or more car wash rotating cleaning elements for washing the exterior surface of the car includes the first car wash rotating cleaning element, and a second car wash rotating cleaning element.

3. A car wash system configured to reclaim excess gallons per minute (GPM) capacity of a hydraulic pump of the car wash system, the car wash system including one or more car wash rotating cleaning elements for washing an exterior surface of a car, the car wash system comprising:

the hydraulic pump having a GPM capacity greater than a GPM requirement of the one or more car wash rotating cleaning elements at maximum load, wherein the GPM requirement is defined as flow in gallons per minute required to operate the one or more car wash rotating cleaning elements at maximum load, the difference between the GPM capacity and the GPM requirement defining the excess GPM capacity;

the one or more car wash rotating cleaning elements wherein the hydraulic pump is fluidly connected to the one or more car wash rotating cleaning elements;

a first hydraulic motor wherein the hydraulic pump is fluidly connected to the first hydraulic motor, the first hydraulic motor operated by the excess GPM capacity of the hydraulic pump;

a first electrical generator wherein the first hydraulic motor is drivingly connected to the first electrical generator and the first electrical generator is operative to generate electricity for transferring to an electric grid or a rechargeable battery;

a second hydraulic motor wherein the hydraulic pump is fluidly connected to the second hydraulic motor and the second hydraulic motor is systemically connected to a first car wash rotating cleaning element;

a second electrical generator wherein the second hydraulic motor is drivingly connected to the second electrical generator;

at least one first valve which selectively routes hydraulic fluid from the hydraulic pump to the second hydraulic motor during an entire second car wash cycle when the first car wash rotating cleaning element is not used during operation of the car wash system;

a third hydraulic motor wherein the hydraulic pump is fluidly connected to the third hydraulic motor and the third hydraulic motor is systemically connected to a second car wash rotating cleaning element;

a third electrical generator wherein the third hydraulic motor is drivingly connected to the third electrical generator;

at least one second valve which selectively routes hydraulic fluid from the hydraulic pump to the third hydraulic motor during the second car wash cycle when the second car wash rotating cleaning element is not being used during operation of the car wash system;

wherein the car wash is configured to perform a first car wash cycle, and the second car wash cycle, in the first car wash cycle, the car wash system performs some of a plurality of cleaning applications, and in the second car wash cycle, the car wash system performs the cleaning applications of the first car wash cycle, and one or more additional cleaning applications of the plurality of cleaning applications; and wherein the one or more car wash rotating cleaning elements for washing the exterior surface of the car includes the first car wash rotating cleaning element, and the second car wash rotating cleaning element.

4. A car wash system configured to reclaim excess gallons per minute (GPM) capacity of a hydraulic pump of the car wash system, the car wash system including one or more car wash rotating cleaning elements for washing an exterior surface of a car during one of a plurality of cleaning applications of a car wash cycle, the one or more car wash rotating cleaning elements including a first car wash rotating cleaning element, the car wash system comprising:

the hydraulic pump wherein the hydraulic pump is fluidly connected to the one or more car wash rotating cleaning elements, the hydraulic pump having a hydraulic fluid GPM capacity greater than a GPM requirement of the one or more car wash rotating cleaning elements at maximum load, wherein the GPM requirement is defined as flow in gallons per minute required to operate the one or more car wash rotating cleaning elements at maximum load, the difference between the GPM capacity and the GPM requirement defining the excess GPM capacity;

a first hydraulic motor wherein the hydraulic pump is fluidly connected to the first hydraulic motor, the first hydraulic motor operated by the excess GPM capacity of the hydraulic pump;

a first electrical generator wherein the first hydraulic motor is drivingly connected to the first electrical generator;

a second hydraulic motor wherein the hydraulic pump is fluidly connected to the second hydraulic motor and the second hydraulic motor is systemically connected to the first car wash rotating cleaning element;

a second electrical generator wherein the second hydraulic motor is drivingly connected to the second electrical generator;

at least one first valve which selectively routes hydraulic fluid from the hydraulic pump to the second hydraulic motor during the car wash cycle; and wiring which connects the first electrical generator and second electrical generator to a service panel or a rechargeable battery.

5. The car wash system of claim 4, the car wash system further comprising:

a second car wash rotating cleaning element of the one or more car wash rotating cleaning elements;

a third hydraulic motor wherein the hydraulic pump is fluidly connected to the third hydraulic motor and the third hydraulic motor is systemically connected to the second car wash rotating cleaning element;

a third electrical generator wherein the third hydraulic motor is drivingly connected to the third electrical generator;

at least one second valve which selectively routes, during the wash cycle, hydraulic fluid from the hydraulic pump to the third hydraulic motor when the second car wash rotating cleaning element is not being used during the wash cycle.

6. The car wash system of claim 4, further comprising:

a third or additional hydraulic motors, each hydraulic motor fluidly connected to the hydraulic pump and systemically connected to one of the one or more car wash rotating cleaning elements;

an electrical generator wherein each of the third or additional hydraulic motors is drivingly connected to the electrical generator;

a valve which selectively routes hydraulic fluid from the hydraulic pump to one of the third or additional hydraulic motors corresponding to the one of the plurality of car wash rotating cleaning elements not being used during operation of the car wash system.

7. A car wash system configured to reclaim excess gallons per minute (GPM) capacity of a hydraulic pump of the car wash system, the car wash system having a plurality of car wash rotating cleaning elements for washing an exterior surface of a car, the plurality of car wash rotating cleaning elements defining a GPM requirement of the plurality of car wash rotating cleaning elements at maximum load, wherein the GPM requirement is defined as flow in gallons per minute required to operate the plurality of car wash rotating cleaning elements at maximum load, the excess GPM capacity of the hydraulic pump defined as a difference between the hydraulic pump capacity and the GPM requirement of the plurality of car wash rotating cleaning elements at maximum load, the system comprising:

the hydraulic pump fluidly connected to the plurality of car wash rotating cleaning elements;

a first hydraulic motor wherein the hydraulic pump is fluidly connected to the first hydraulic motor and the first hydraulic motor is systemically connected to a first car wash rotating cleaning element of the plurality of car wash rotating cleaning elements;

a first electrical generator wherein the first hydraulic motor is drivingly connected to the first electrical generator;

a first valve which selectively routes hydraulic fluid from the hydraulic pump to the first hydraulic motor when the first car wash rotating cleaning element is not being used during operation of the car wash system;

wiring which connects the first electrical generator to a service panel or a rechargeable battery;

a second hydraulic motor wherein the hydraulic pump is fluidly connected to the second hydraulic motor and the second hydraulic motor is systemically connected to a second car wash rotating cleaning elements;

a second electrical generator wherein the second hydraulic motor is drivingly connected to the second electrical generator;

a second valve which selectively routes hydraulic fluid from the hydraulic pump to the second hydraulic motor when the second car wash rotating cleaning element is not being used during operation of the car wash system; and wiring which connects the second electrical generator to the service panel or the rechargeable battery.

8. A car wash system configured to reclaim excess gallons per minute (GPM) capacity of a hydraulic pump of the car wash system, the car wash system having a plurality of car wash rotating cleaning elements for washing an exterior surface of a car, the plurality of car wash rotating cleaning elements defining a GPM requirement of the plurality of car wash rotating cleaning elements at maximum load, wherein the GPM requirement is defined as flow in gallons per minute required to operate the plurality of car wash rotating cleaning elements at maximum load, the excess GPM capacity of the hydraulic pump defined as a difference between the hydraulic pump capacity and the GPM requirement of the plurality of car wash rotating cleaning elements at maximum load, the system comprising:

- a hydraulic pump fluidly connected to the plurality of car wash rotating cleaning elements;
- a plurality of hydraulic motors wherein each hydraulic motor is fluidly connected to the hydraulic pump and each hydraulic motor is systemically connected to one of the plurality of car wash rotating cleaning elements;
- a plurality of electrical generators, one hydraulic motor drivingly connected to each of the plurality of electrical generators; and
- a plurality of valves, each valve fluidly connected to one of the hydraulic motors and operative to selectively route hydraulic fluid from the hydraulic pump to each hydraulic motor of the plurality of hydraulic motors which is not being used to drive one of the plurality of car wash rotating cleaning elements during use of the car wash system.

* * * * *